United States Patent [19]
Conley

[11] 4,066,140
[45] Jan. 3, 1978

[54] HEAVY DUTY INDUSTRIAL SCALE

[75] Inventor: Fred Miller Conley, Highland, Calif.

[73] Assignee: Gardner-Denver Company

[21] Appl. No.: 666,884

[22] Filed: Mar. 15, 1976

[51] Int. Cl.² .................................................. G01G 19/02
[52] U.S. Cl. ............................ 177/134; 73/141 A; 177/211; 177/255
[58] Field of Search .............. 177/211, 210 R, 134, 177/255, DIG. 9; 73/141 A

[56] References Cited
U.S. PATENT DOCUMENTS

| | | | |
|---|---|---|---|
| 1,650,204 | 11/1927 | Gilbert | 177/257 |
| 3,439,761 | 4/1969 | Laimins | 177/211 |
| 3,797,593 | 3/1974 | Conley | 177/134 |
| 3,985,025 | 10/1976 | Ormond | 177/255 X |

Primary Examiner—Joseph W. Hartary
Attorney, Agent, or Firm—Christie, Parker & Hale

[57] ABSTRACT

A plurality of mounts carry a weighbridge or platform. Each mount has a transducer that carries the mounts portion of the load and indicates weight by strain in shear. The weighbridge loads a horizontal cross pin. The pin, in turn, loads a link that loads a second, integrally connected link. The second link loads the middle of the transducer of the mount in shear. The transducer and cross pin lie orthogonally. The ground rigidly supports the ends of the transducer. The links coupling the transducer and cross pin transmit only vertical forces to the transducer to load the latter only in shear and permit horizontal movement of the weighbridge.

33 Claims, 7 Drawing Figures

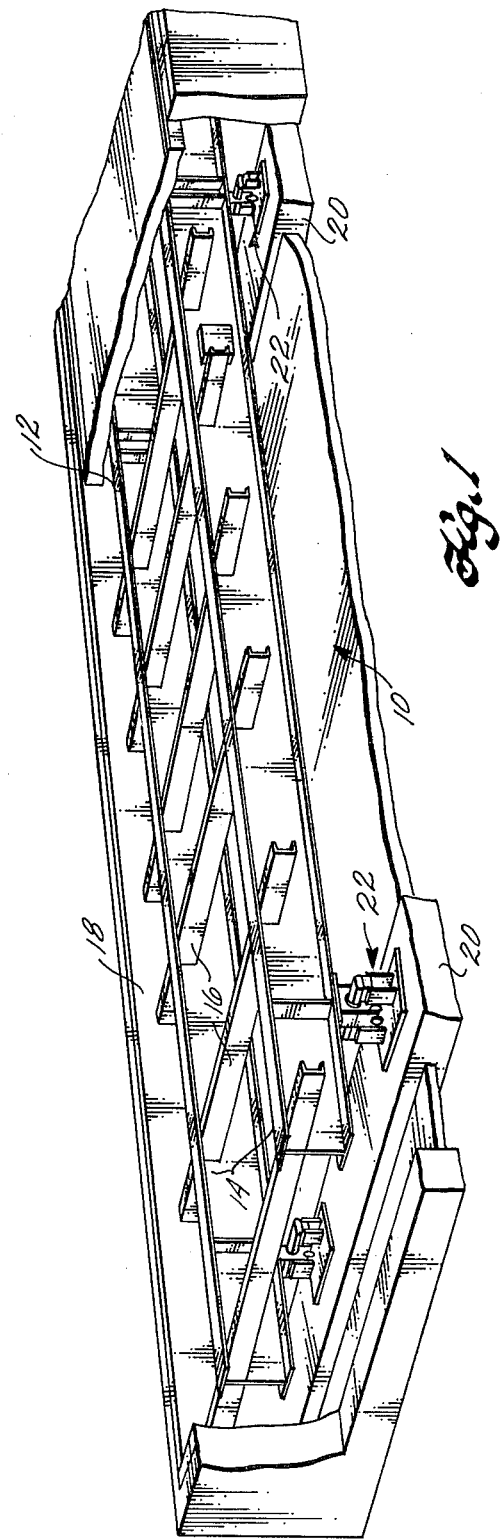

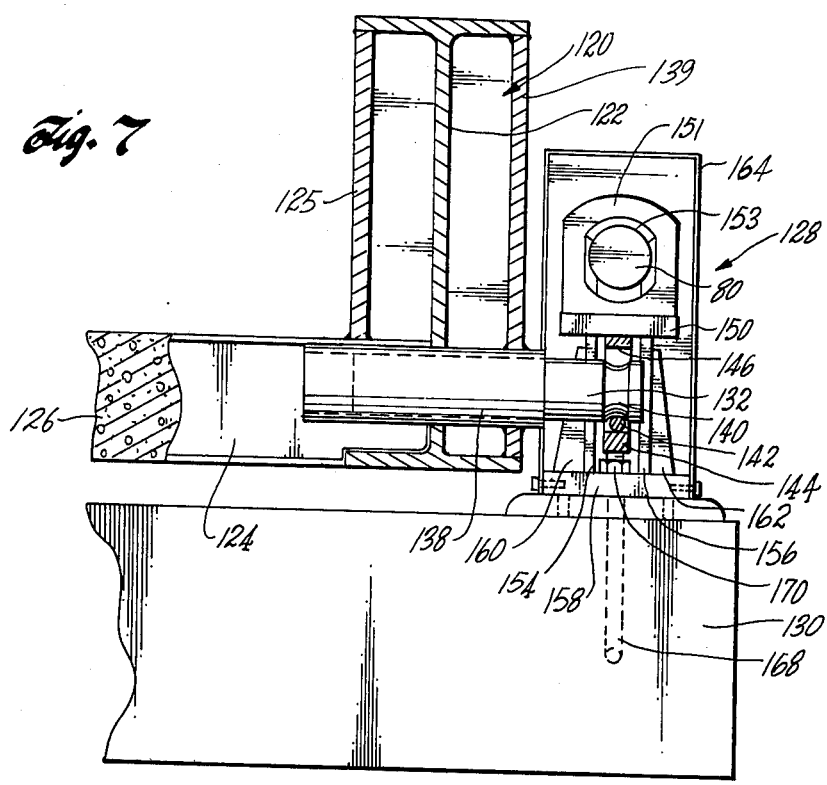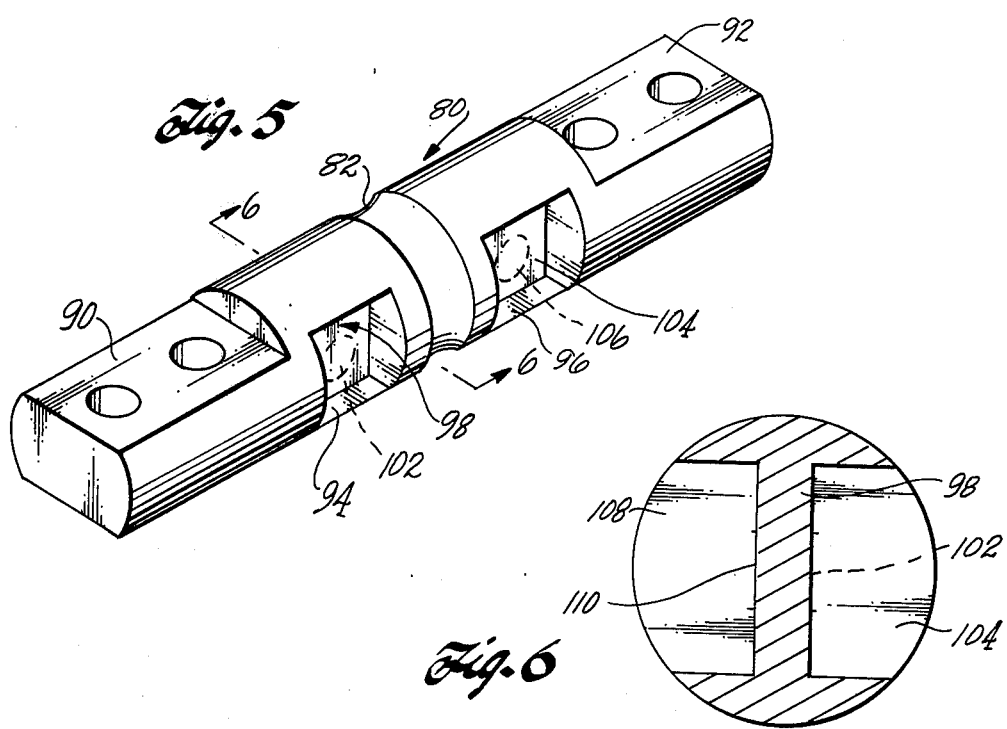

HEAVY DUTY INDUSTRIAL SCALE

BACKGROUND OF THE INVENTION

The present invention relates to load determining devices and has particular application to large industrial scales which support their loads by load indicating transducers.

Industrial scales for weighing large objects are used, for example, to weigh trucks and locomotives and to determine their payload.

A typical industrial scale employs a massive weighing platform or weighbridge. The vehicle to be weighed is driven onto the weighbridge. The weighbridge couples to ground through mounts which include load cells or transducers. These transducers generate electrical signals proportional to the load applied to them. There are several mounts for a weighbridge and the sum of the loads on all the mounts is the weight of the weighbridge, the vehicle it supports, and the payload of the vehicle. Obviously with the weight of the weighbridge and the vehicle known, the payload is the total load less the load of the vehicle and weighbridge.

Each transducer takes the entire load on its mount and undergoes elastic strain when loaded. Strain gauges indicate the strain of the transducer as electrical signals proportional to the load on the transducer. These signals are totalized to indicate load.

The load indicating transducers used in weighbridges have typically been of the cantilever type, tension type, or compression type. The cantilever type has one end rigidly connected to ground and the other end loaded by the weighbridge for bending of the transducer. The strain is measured by the amount of elongation and shortening of the transducer resulting from its bending, and this is related to load on the weighbridge. The tension and compression transducers are loaded along their axes. A tension transducer has balanced forces applied along its axis and away from one another. A compression transducer has balanced forces along its axis and towards each other.

Strain gauges are accurate to reflect elastic strain along a predetermined direction of a transducer. When strain occurs in directions not in the predetermined direction, the load indicated by the strain gauge will not be an accurate indication of true weight.

In a typical application the load is determined by summing up all the loads on all the transducers. If the signals from these transducers are not directly proportional to the load sensed by them, it will be very difficult to get an accurate signal representing total load. The lack of direct proportionality of a signal with load means that the signal is a non-linear function of load. The relative loading of the transducers with respect to one another varies with the position of the load on the weighbridge and this fact along makes linear-with-load transducers almost necessity.

Horizontal loads on a weighbridge must be accommodated. These loads occur, for example, when a vehicle drives onto the weighbridge. If these loads are allowed to affect the strain in the transducers, then the accuracy of the scale is limited by the amount of error caused by the horizontal loading. While in the example given such loading is transient, it can still be relatively longlasting, for the weighbridge will oscillate. Moreover, wind can cause longlasting horizontal loading. In summary, the load indicating transducers indicate loads accurately only when they are loaded in design directions. The mounts for the load indicating transducers must therefore load the transducers only along the designed directions. This is a difficult task.

U.S. Pat. No. 3,797,593 describes many of these considerations in detail. It also describes a linkage system which isolates a tension loaded transducer from the effects of horizontal forces.

Industrial scales are relatively expensive. A major portion of the expense of an industrial scale is directly related to the height of the scales. The height of a scale measures how much excavation there must be to accommodate the scale in level-with-grade scales and how much supporting framework is necessary in all scales. Expense is directly related to the amount of excavation and framework. Accordingly, it it can be done without sacrificing accuracy, reduced overall height of an industrial scale will mean less cost.

SUMMARY OF THE INVENTION

The present invention provides an improved load indicating mount such as for use in an industrial scale. The mount has a shear-loaded transducer or load cell. The transducer rigidly connects at its ends to ground, and loads in its middle normal to its horizontal axis through linkage that accommodates horizontal movement of the load source in response to horizontal forces, without the forces affecting the load indicating performance of the transducer.

A specific form of the present invention contemplates a weighbridge supported above ground by a plurality of mounts. Each of these mounts has a load indicating transducer or load cell loaded in pure shear and in mechanical series force relationship between ground and the weighbridge. The ends of the transducer anchor rigidly to ground as through stands. Each shear-loaded transducer couples between the weighbridge and the ground by means which yield to horizontal forces in either horizontal direction so that the transducer experiences no horizontal or torsional stresses.

More specifically, each load indicating transducer horizontally mounts rigidly to ground at its ends. A medial section of the transducer is loaded by an upper link which applies force normal to the axis of the transducer and in the vertical. Preferably the link receives the transducer in a passage of the link. The link has a major plane normal to the axis of the transducer and in the vertical. A second lower link rigidly connects to the first link and has a major plane in the vertical but at right angles to the plane of the first link. A passage of the second link passes a cross pin which loads the second link in the vertical. The ends of the cross pin may be loaded by depending arms of a girder chair. The girder chair supports a portion of the weighbridge. An alternative attaches the cross pin directly to the weighbridge, the mount being located to one side of the weighbridge. The cross pin and transducer are both in the horizontal but at right angles to one another. This facilitates horizontal force accommodation and the nesting of the cross pin between the stands which rigidly connect the ends of the transducer to ground.

Preferably, the upper link and the transducer are in bearing at an upper slot or groove of the transducer and a bearing surface of the link on the upper perimeter of the passage which receives the transducer. The groove has a root on a curve which has a convex upward curvature greater than a concave downward curvature of the bearing surface of the link. This self-centers the link on the transducer. The bearing surface of the link is convexly rounded transverse to the plane of the link to align the link on the transducer in that direction. The contact between the link through the bearing piece and the transducer is in a very small area. A similar arrangement couples the second or lower link to the cross pin. In this coupling the bearing surface of the link faces upwardly and the surface of the cross pin it bears on faces downwardly. The grooves of the cross pin and the link locate the cross pin, links and transducers with respect to each other in the horizontal. Horizontal disturbances of the weighbridge along the axis of the transducer result in the link and weighbridge oscillating about the axis of the cross pin. Horizontal displacements at right angles to the axis of the transducer result in the link and weighbridge oscillating about the axis of the transducer. These oscillations are orthogonal to one another and permit a degree of horizontal movement in any horizontal direction.

The transducer ends anchor to ground through the stands which extend vertically. The ends of the transducers are preferably rigidly joined to blocks of appreciable area which are in turn anchored to concrete of the stands. The concrete can be reinforced above the floor of the pit of the scale by upright plates secured to a horizontal base which is secured to the concrete floor. The stands and links nest with the links received in a space between stands. This reduces the vertical dimension of the mount.

Loading the transducer in the middle and reacting the loading at its ends is compensated for by generating load indicating signals from each side of the load application zone and summing the signals. In a basically cylindrical transducer, hollows or pockets can define rectangular in cross section webs upon which strain gauges mount. These pockets lie on both sides of the loading zone of the transducer.

The mount of the present invention combines the error-free performance of the scale shown in U.S. Pat. No. 3,797,593 and the accommodation to horizontal displacements indicated in that patent, while reducing the overall height of the scale to thereby reduce considerably the cost of the scale.

These and other features, aspects and advantages will become more apparent from the following description, appended claims, and drawings.

BRIEF DESCRIPTION OF THE FIGURES

FIG. 1 is a perspective view, partly broken away, of an industrial scale in accordance with the preferred embodiment of the present invention;

FIG. 5 is a perspective view of the transducer of the present invention;

FIG. 6 is a cross-sectional view taken along line 6—6 of FIG. 5; and

FIG. 7 is a frontal elevation of an alternate embodiment of the mount of the present invention with a portion of a weighbridge.

DESCRIPTION OF THE PREFERRED EMBODIMENTS

Figure 4:
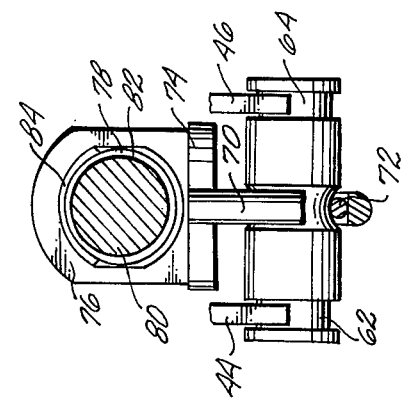
FIG. 4 is a fragmentary view of the cross pin, link assembly and load transducer, the latter in section, of the mount of the present invention.

FIG. 1 illustrates a heavy duty industrial scale 10. The scale has a large, massive platform or weighbridge 12 onto which a vehicle, such as a heavy truck or locomotive, can be driven for purposes of weighing a load carried by the vehicle. The weighbridge is standard and has longitudinal, parallel and spaced apart I-beams 14 tied together by cross channels 16. The scale typically is in a scale pit 18. Piers 20 are at regular intervals on the bottom of the pit. The piers support mounts 22 constructed in accordance with the present invention. The mounts transmit the "weight" load of the weighbridge and what it carries to the ground through the piers. The depth of the pit obviously is related to the height of each of the mounts. Each of the mounts senses the vertical load it supports and transmits the sensed signal to a totalizing device which adds signals from all the mounts to get a total reading. The load distribution on the mounts normally is not uniform because of the distribution of the load of a vehicle on the location of the vehicle on the weighbridge. The load sensed by the mounts, therefore, is usually not the same between the mounts.

In short, the usual case is that the load on all the mounts is not the same. Therefore, the signals generated at the mounts should be highly linear if an accurate weight is to be indicated by the totalizer.

The sensing of elastic strain in a member by strain gauges can generate very linear signals. Linearity occurs when the member is strained along predetermined directions corresponding to the orientation of the strain gauges. However, if there is a loading of the members in different directions, the strain gauges can pick up signals from these off-direction loads and the gauge's response will not be linear in the sense that there is discrimination of the weight of the weighbridge and what it carries from other loads. These undesirable, off-direction loads are called spurious loads. With the loss in linearity, accuracy is lost.

U.S. Pat. No. 3,797,593 describes a heavy duty industrial scale where all signals except pure tension were prevented from reaching the load transducer. The resulting scale is highly accurate. However, the linkage required to isolate the transducer also resulted in a fairly high scale. As previously mentioned, the cost of a scale is directly related to its height dimension.

It is recognized that an attractive technique for measuring load is to measure shear load. Shearing stresses are a measure of applied force and are independent of bending moments.

The mount of the present invention employs a shear-loaded transducer or load cell in the mount as the means for measuring a load taken by the mount. It will be observed that the overall height of the mount is comparatively low and, accordingly, the height of the scale employing the mount will be desirably low.

Figure 3:
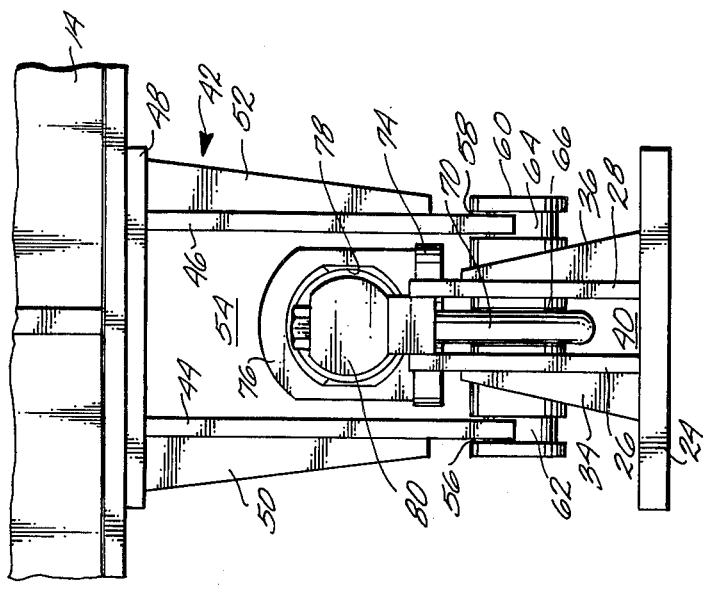
FIG. 3 is an end elevational view of the mount in FIG. 2.
Figure 2:
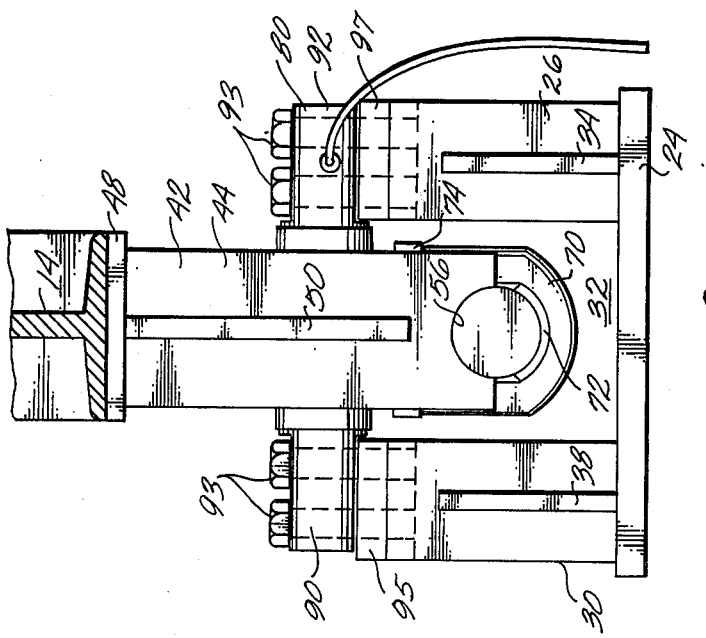
FIG. 2 is a side elevational view of a mount in accordance with the present invention.

With reference to FIGS. 2 and 3, the mounts include a base 24 rigidly secured to piers 20, as by bolts, for transmission of the load of the scale that is carried on the particular mount. A pair of spaced-apart stands 26 and 28 extend from an integral connection with base plate 24. Spaced from these stands are a complementary pair of stands 30 and one not shown but identical to stand 28. A space 32 is between stand pairs. The stands may include stiffeners such as gussets 34, 36 and 38 rigidly attached as by welding to the upright portions of the stands and at the base of the gussets to base plate 24.

Each pair of stands has a space between them as indicated at 40 in FIG. 3. Thus the stands define aligned interior spaces 40 between facing upright portions and a space 32 in tandem with the upright portions.

A girder chair of the mount is indicated at 42 and includes a pair of legs 44 and 46 which depend from a horizontal cap 48. Legs 44 and 46 are rigidly interconnected to cap 48 as by gussets 50 and 52, respectively. These gussets are welded to legs 44 and 46 and to the base. A space 54 between legs 44 and 46 provides for a structure to be described subsequently. Cap 48 directly supports a longitudinal I-beam 14 of the weighbridge.

The bottom ends of legs 44 and 46 are recessed at 56 and 58 to receive a cross pin 60 at annular grooves 62 and 64. Grooves 62 and 64 are axially flanked by portions of the pin of larger diameter so as to axially locate the pin in depending legs 44 and 46 of the girder chair and prevent axial movement of the pin with respect to the legs. Pin 60 is medially grooved at 66 for receipt by a lower link 70. This lower link has a passage through it for receiving the cross pin. An arcuate bearing piece 72 having a generally circular cross section is welded to the main body of the link to provide a bearing surface in contact with pin 60 at groove 66. The radius at the base of the groove in contact with bearing piece 72 is smaller than the radius of the surface of the bearing piece so that actual contact is determined in a small area at the bottom of the groove. In other words, the curvature of the bearing piece is less than the curvature of the groove where the two contact. The bearing piece, which is at the lower perimeter of the passage of the link, has a concave upward curvature. The groove with which it cooperates is convex downward. In planes parallel to the axis of the lower link passage, the bearing piece is convex upwardly curved, and the groove of the pin is concave downwardly curved. The cross pin and link couple to transmit only vertical, downwardly directed loads from the girder chair to the link. Horizontal loading results in pendulous-like movements in all horizontal directions.

Link 70 depends from an integral connection with a connecting piece 74. This piece connects link 70 to an upper link 76. As is clear from FIGS. 3 and 4, links 70 and 76 have major planes at right angles to each other.

Upper link 76 has a passage 78 for receipt of shear loaded transducer 80. Transducer 80 has a circular groove 82 in receipt of a bearing piece 84 of link 76. Again, the curvature at the base or root of the groove is greater than the curvature of the bearing piece for limited contact area. The curvature of the bearing piece is concave downward and the curvature of groove 82 is convex upward. In planes parallel to the axis of passage 78 the bearing piece and groove are curved in the manner of the lower link and cross pin. The bearing piece cradles on the groove with a limited contact at the apex of its curve.

The assembly of lower link 70, connecting piece 74, and upper link 76, couple the weighbridge to transducer 80 in a manner which permits horizontal movement of the weighbridge without generating spurious signals. The link assembly yields to horizontal displacements. The perimeters of the link passages and cooperating groove surfaces of the cross pin and transducer vertically align the link assembly. The orientation of the depending legs and cross pin at right angles to the orientation of the transducer allows a vertically shallow mount. Required vertical dimensions are achieved by parallel, side-by-side orientations and not by stacking.

Thus legs 44 and 46 parallel stands 26, 28, 30, and the one not shown.

Transducer 80 is loaded in pure shear in the zone of groove 82 and this load is at right angles to the cross section of the transducer. Preferably, strain gauges are placed on either side of groove 82 and the total strain indicated by these gauges used to determine load. This avoids inaccuracies from tolerances between gauge locations and the groove and where in the groove load is applied.

The transducer rigidly attaches to ground at its ends. Thus ends 90 and 92 of the transducer are drilled for receipt of fasteners 93. These fasteners pass through the ends and into anchor blocks 95 and 97. These blocks can be secured to concrete in the spaces between the uprights of a stand pair.

Transducer 80 is shown in perspective in FIG. 5. The transducer is milled to each side of groove 82 to develop pockets bounded by a web. The web response is to shear loading by elastic shear strain. The milled zones or pockets shown are indicated by reference character numerals 94 and 96. A web 98 at the base of pocket 94 mounts a strain gauge in the area shown by the dashed circle at 102. In like manner on the opposite side of groove 82 a web 104 at the base of pocket 96 mounts a strain gauge in area 106. There are identical recesses on the opposite side of the transducer so that the webs 98 and 104 are thin-walled, vertical sections having parallel and flat sides. This is seen to best effect in FIG. 6 for web 98. A pocket 108 opposite pocket 94 defines at its base one of the vertical walls of web 98. Thus the shear section of web 98 is similar to the section of an I-beam. A strain gauge is placed on the base wall of pocket 108 at 110. The geometry of pocket 96 and its complement on the opposite side of the transducer is identical for that shown for pockets 94 and 108.

It should be clear that the strain gauge response to load can be changed by changing the thickness of the web. It will also be apparent that the load transducer is strong in that it is supported at its ends and there is a limited span between supports. This strength reduces the bulk of the transducer and reduces the size of attending mount hardware relative to prior art transducers, such as cantilever loaded transducers. The placement of strain gauges to each side of groove 82 and determining load by adding their signals makes the location of actual loading along the length of the transducer uncritical.

In operation, the load on weighbridge 12 is transmitted to the plurality of mounts which support the bridge. Each mount supports some of the vertical load, with the sum of the loads supported by the mounts equal to the weight of the weighbridge and what it carries. The load on an individual mount 22 will go to girder chair legs 44 and 46 and onto the cross pin 60. The cross pin will vertically load bottom link 70 of the integral link pair, which load will be transmitted to upper link 76 of the integral link pair through connecting piece 74 between the two links. The upper pair through its bearing piece 84 will load the shear trandsucer in its middle at groove 82. The deformation of the shear transducer will be picked up by strain gauges, and the resultant electrical signal will be sent to a totalizer for summation with the balance of the signals from the other mounts to determine the total load. Horizontal disturbances on the weighbridge are permitted by the coupling of bottom link 70 to cross pin 60 and top link 76 to transducer 80. These couplings yield to loads other than in the vertical.

The links and cooperating cross pin and transducer have self-centering curvatures. In the vertical plane at right angles to the transducer axis, the upper link always centers on the uppermost portion of the receiving groove of the transducer by virtue of the concave downward curvature of the upper link bearing perimeter and the convex upward curvature of the groove of the transducer. Centering of the upper link in the orthogonal vertical plane containing the axis of the transducer results from the curvatures seen in this plane of the convex downward curvature of the link bearing piece and the concave upward curvature of the transducer groove. The bottom link and cross pin have similar centering curvatures in concave upward curvature of the link which mate with the convex downward curvature of the cross pin and, in the orthogonal vertical plane, the complementary curvatures of the bearing piece and the groove. The orthogonal disposition of the couplings between the bottom link and the cross pin on the one hand, and the upper link and the transducer on the other, permits full horizontal movement of the weighbridge in all horizontal directions. The couplings of the link assembly to the cross pin and the transducer permit pendulous movement of the weighbridge with respect to the link assembly in all horizontal directions and pendulous movement of the link assembly with respect to the transducer in all horizontal directions.

FIG. 7 illustrates an alternate embodiment of the mount of the present invention. This embodiment envisions the placement of a mount to the side of a weighbridge instead of beneath it. In this configuration, the girder chair of the previous embodiment is eliminated. The cross pin extends laterally from a weighing platform or weighbridge 120. The platform is not shown to any great extent in FIG. 7. What is shown includes a fore-and-aft or longitudinal beam or girder 122. A cross beam or girder 124 goes between 122 and a parallel and complementary bea to beam 122. The cross beams are coped to fit over the interior flanges of the longitudinal girders. Fore-and-aft stiffener plates are welded to the cross beams and the top flange of the longitudinal girders to present vertical and continuous curbs between the girders. There are complements to beam 124 spaced regularly along the length of the weighing platform. Thus the framing arrangement of the platform is not unlike that shown in FIG. 1. The volume within the fore-and-aft girders and between the cross beams is filled with concrete 126 to the level of the top of the cross beams. Mounts such as mount 128 are disposed regularly about the lateral periphery of the weighbridge. These mounts are supported on piers 130 which may be buried.

A horizontal cross pin 132 secures ridigly to the weighing platform. To this end, a sleeve 138 attaches to the girders of the platform as by welding and the sleeve receives cross pin 132. Sleeve 138 is received in a hole in a stiffener plate 139 and welded to the plate and the web of longitudinal girder 122. The stiffener plate is welded to the flanges of the fore-and-aft girder. The cross pin has a circular groove 140 which bears on a bearing piece 142 of a link 144. The stiffener plate supports the sleeve near the load point where load transmits from the cross pin to link 144. In a plane passing through the axis of the cross pin and normal to that axis, the bearing piece is concave upward and the groove is convex downward. In this plane, the radius of curvature of the bearing piece exceeds the radius of curvature of the groove for the self-aligning and limited area contact of the mount in the manner described earlier. The bearing piece is within a closed passage 146 of the link. A horizontal connecting piece 150 secures link 144 to an orthogonally oriented link 151. Link 151 has an upper bearing piece 153 which rests in groove 82 of transducer 80 in the manner previously described. The radius of curvature of the bearing piece is larger than the radius of curvature of the groove. The groove is convex upward and the bearing piece concave downward. In the orthogonal section, the bearing piece and groove look like bearing piece 142 and groove 140.

The mount further includes the upright stands similar to those previously described. These stands are vertical plates 154 and 156 secured to a base 158 and reinforced, respectively, by gussets 160 and 162. The gussets attach to the vertical plates and the base. The mount has a cover 164.

Base 158 anchors to pier 130 as through threaded anchor rods 168 secured in the concrete pier to the base as by threads and nut 170.

The mount just described, then, is similar to the mount of previous Figures, except that a girder chair is eliminated and the cross pin attaches directly to the weighing platform. An additional difference has the mounts to one side of the weighing platform instead of beneath it. This eliminates the necessity for a scale pit.

The operation of this embodiment is essentially identical to the previously described, so the description will not be repeated. It should be noted, however, that the nesting of the cross pin and transducer through the link arrangement is possible and that horizontal excursions of the weighing platform are possible without affecting the accuracy of the transducer because these loads are not consequently imposed.

The present invention has been described with reference to certain preferred embodiments. The spirit and scope of the appended claims should not, however, necessarily be limited to the foregoing description.

What is claimed is:

1. In a weight determining apparatus having a means for supporting an object to be weighed, a plurality of mounts carrying the support means above ground, transducer means of the mounts responsive to measure the weight of the object by elastic deformation of the transducer means, and means responsive to the transducer means to indicate the weight of an object, an improvement in each of the mounts which comprises:
   a. a shear loaded transducer;
   b. means for mounting the transducer in the horizontal with the ends thereof rigidly affixed to ground; and
   c. means for vertically loading the transducer with the support means and the object intermediate the ends of the transducer, the entire weight of the support means and the object being supported by the transducers of all the mounts, the loading means yielding freely to all horizontal forces by moving pendulously with respect to the transducer in a first vertical plane containing the horizontal axis of the transducer and in a second vertical plane normal to the first vertical plane, the yielding of the loading means isolating the transducer from the horizontal forces.

2. The improvement claimed in claim 1 wherein the loading means includes:
   an upper link engaged with the transducer to apply the vertical load thereto, the pendulous movements of the loading means being provided by the link engagement, the engagement being such that the link moves pendulously with respect to the transducer in the first vertical plane containing the horizontal axis of the transducer and in the second vertical plane normal to the first vertical plane.

3. The improvement claimed in claim 2 wherein the support means includes a weighbridge and the loading means includes:
   a lower link engaging the upper link to apply the vertical load thereto;
   a cross pin in the horizontal and with an axis normal to the axis of the transducer, the cross pin engaging the lower link to apply the vertical load thereto, the cross pin and the lower link being engaged to permit pendulous movements of the cross pin with respect to the lower link in the first and second vertical planes;
   a girder chair engaging the weighbridge and the cross pin to apply the vertical load to the cross pin; and
   the vertical load being applied serially to the girder chair, cross pin, lower link, upper link and transducer.

4. The improvement claimed in claim 3 wherein:
   the transducer has an upward facing groove normal to the axis thereof with a convex upward curvature;
   the upper link has a passage therein with a concave downward upper perimeter nesting in the groove of the transducer;
   the cross pin has a downward facing groove normal to the axis thereof with a convex downward curvature; and
   the lower link has a passage therein with a concave upward lower perimeter nesting in the groove of the cross pin.

5. The improvement claimed in claim 4 wherein the upper and lower links rigidly interconnect.

6. The improvement claimed in claim 5 wherein the groove in the transducer has a concave upward curvature in vertical planes parallel to the axis of the transducer and the upper perimeter of the link is convex downward in these vertical planes.

7. The improvement claimed in claim 6 wherein the groove in the cross pin has a concave downward curvature in vertical planes parallel to the axis of the cross pin and the lower perimeter of the lower link is convex upward in these vertical planes.

8. The improvement claimed in claim 7 wherein the girder chair has depending legs which engage the cross pin and which are generally oriented to one side of the links in the same vertical zone.

9. The improvement claimed in claim 2 wherein the support means includes a weighbridge and the mounts are laterally of the weighbridge, the loading means including:
   a lower link engaging the upper link to apply the vertical load thereto;
   a cross pin in the horizontal and with an axis normal to the axis of the transducer, the cross pin engaging the lower link to apply the vertical load thereto, the cross pin and the lower being engaged to permit pendulous movements of the cross pin with respect to the lower link in the first and second vertical planes;
   means securing the cross pin to the weighbridge for applying the vertical load to the cross pin and with the cross pin extending laterally of the weighbridge; and
   the vertical load being applied serially and successivley to the securing means, cross pin, lower link, upper link and transducer.

10. The improvement claimed in claim 9 wherein:
    the transducer has an upward facing groove normal to the axis thereof with a convex upward curvature;
    the upper link has a passage therein with a concave downward upper perimeter nesting in the groove of the transducer;
    the cross pin has a downward facing groove normal to the axis thereof with a convex downward curvature; and
    the lower link has a passage therein with a concave upward lower perimeter nesting in the groove of the cross pin.

11. The improvement claimed in claim 10 wherein the upper and lower links rigidly interconnect.

12. In combination with a heavy duty industrial scale of the type having a weighbridge supported by a plurality of load indicating mounts, and means responsive to signals from all the mounts to indicate the weight of an object, an improvement in each of the mounts which comprises:
   a. a shear-loaded transducer horizontally disposed;
   b. means for rigidly mounting the ends of the shear-loaded transducer to ground;
   c. means for loading the shear-loaded transducer only in shear in a zone intermediate the ends of the transducer are only in a vertical direction;
   d. means on each side of the loading zone for producing signals responsive to shear load; and
   e. means for loading the transducer including means for permitting horizontal movement of the weighbridge in response to horizontal forces by pendulous movements of the loading means with respect to the transducer in a first vertical plane containing the horizontal axis of the transducer and in a second vertical plane normal to the first vertical plane.

13. The improvement claimed in claim 12 wherein the loading means includes:
    an upper link engaged with the transducer to apply the vertical load thereto, the engagement providing the pendulous movement of the loading means through pendulous movements of the link with respect to the transducer in the first vertical plane containing the horizontal axis of the transducer and in the second vertical plane normal to the first vertical plane.

14. The improvement claimed in claim 13 wherein the loading means includes:
    a lower link engaging the upper link to apply the vertical load thereto;
    a cross pin in the horizontal and with an axis normal to the axis of the transducer, the cross pin engaging the lower link to apply the vertical load thereto, the cross pin and the lower link being engaged to permit pendulous movements of the cross pin with respect to the lower link in the first and second vertical planes;
    a girder chair engaging the weighbridge and the cross pin to apply the vertical load to the cross pin; and
    the vertical load being applied serially to the girder chair, cross pin, lower link, upper link and transducer.

15. The improvement claimed in claim 14 wherein:

the transducer has an upward facing groove normal to the axis thereof with a convex upward curvature;

the upper link has a passage therein with a concave downward upper perimeter nesting in the groove of the transducer;

the cross pin has a downward facing groove normal to the axis thereof with a convex downward curvature; and the lower link has a passage therein with a concave upward lower perimeter nesting in the groove of the cross pin.

16. The improvement claimed in claim 15 wherein the upper and lower links rigidly interconnect.

17. The improvement claimed in claim 16 wherein the groove in the transducer has a concave upward curvature in planes parallel to the axis of the transducer and the upper perimeter of the upper link is convex downward in these planes.

18. The improvement claimed in claim 17 wherein the groove in the cross pin has a concave downward curvature in planes parallel to the axis of the cross pin and the lower perimeter of the lower link is convex upward in these planes.

19. The improvement claimed in claim 18 wherein the girder chair has depending legs which engage the cross pin and which are generally oriented to one side of the links in the same vertical zone.

20. The improvement claimed in claim 13 wherein the mounts are laterally of the weighbridge and the loading means includes:

a lower link engaging the upper link to apply the vertical load thereto;

a cross pin in the horizontal and with an axis normal to the axis of the transducer, the cross pin engaging the lower link to apply the vertical load thereto, the cross pin and the lower link being engaged to permit pendulous movements of the cross pin with respect to the lower link in the first and second vertical planes;

means engaging the weighbridge and the cross pin to apply the vertical load to the cross pin and extend the cross pin laterally of the weighbridge; and the vertical load being applied serially and consecutively to the engaging means, cross pin, lower link, upper link and transducer.

21. The improvement claimed in claim 20 wherein:

the transducer has an upward facing groove normal to the axis thereof with a convex upward curvature;

the upper link has a passage therein with a concave downward upper perimeter nesting in the groove of the transducer;

the cross pin has a downward facing groove normal to the axis thereof with a convex downward curvature;

the lower link has a passage therein with a concave upward lower perimeter nesting in the groove of the cross pin; and the upper and lower links rigidly interconnect.

22. In an industrial scale of the type which has a weighbridge for supporting an object to be weighed, a plurality of mounts on the ground for carrying the weighbridge, a transducer for each mount loaded by the weighbridge, the loading of all the transducers producing a signal which indicates the load, and means for totalizing the signals to get total load, an improvement for each mount which comprises:

a. the transducer being a shear-loaded transducer lying in the horizontal and having a medial groove normal to the horizontal axis of the transducer and extending along the top of the transducer;

b. means rigidly mounting the ends of the transducer to ground; and c. means for loading the transducer at the groove in the vertical and normal to the horizontal axis of the transducer, the loading means including a link having a passage, the passage being in receipt of the transducer and having an upper perimeter bearing on the groove, the link being capable of moving freely in the horizontal without loading the transducer in the horizontal, and means for taking the load on the mount of the weighbridge by the link and to transmit this load to the transducer where the link bears on the transducer.

23. The improvement claimed in claim 22 wherein the loading means includes a second link coupled to the first link to load the latter in tension, the second link having a major plane normal to a major plane of the first link, a cross pin lying in the horizontal and having a horizontal axis normal to the horizontal axis of the transducer, the cross pin being received by the second link and being coupled to the second link to load the latter in tension, and a girder chair loaded by the weighbridge and engaging the cross pin to transmit the load of the weighbridge to the cross pin.

24. The improvement claimed in claim 23 including means for self-align the cross pin, second link, first link, and transducer in the vertical.

25. The improvement claimed in claim 24 wherein the links are rigidly interconnected.

26. An improvement in a weight determining apparatus having a weighbridge for supporting an object to be weighed, a plurality of mounts carrying the weighbridge above ground, transducer means of the mounts responsive to measure the weight of the object by elastic deformation of the transducer means, and means responsive to the transducer means to indicate the weight of an object, the improvement characterized in that:

a. each of the mounts is located laterally of the weighbridge;

b. the transducer of each of the mounts is loaded in shear;

c. each mount has menas for mounting the transducer in the horizontal with the ends thereof rigidly affixed to ground; and d. each mount has means for vertically loading the transducer with the weighbridge and the object intermediate the ends of the transducer, the entire weight of the weighbridge and the object being supported by the transducers of all the mounts, the loading means yielding freely to all horizontal forces to isolate the transducer from such forces by permitting pendulous movement of the loading means with respect to the transducer in response to the horizontal forces.

27. The improvement claimed in claim 26 characterized further in that the loading means includes:

an upper link engaged with the transducer to apply the vertical load thereto, the engagement permitting the pendulous movements of the link with respect to the transducer in a first vertical plane containing the horizontal axis of the transducer and in a second vertical plane normal to the first vertical plane.

28. The improvement claimed in claim 27 characterized further in that the loading means for each mount includes:
- a lower link engaging the upper link to apply the vertical load thereto;
- a cross pin rigidly secured to the weighbridge for the application of the vertical load to the cross pin, the cross pin being in the horizontal with its longitudinal axis normal to the axis of the transducer, the cross pin engaging the lower link to apply the vertical load thereto, the cross pin and the lower link being engaged to permit pendulous movements of the cross pin with respect to the lower link in the first and second vertical planes; and
- the vertical load being applied serially to the cross pin, lower link, upper link and transducer.

29. The improvement claimed in claim 28 characterized further in that:
- each transducer has an upward facing groove normal to the axis thereof with a convex upward curvature;
- each upper link has a passage therein with a concave downward upper perimeter nesting in the groove of the transducer;
- each cross pin has a downward facing groove normal to the axis thereof with a convex downward curvature; and
- each lower link has a passage therein with a concave upward lower perimeter nesting in the groove of the cross pin.

30. The improvement claimed in claim 29 characterized further in that the upper and lower links rigidly interconnect.

31. The improvement claimed in claim 30 characterized further in that the groove in each transducer has a concave upward curvature in planes radial and parallel to the longitudinal axis of the transducer, and the upper perimeter of each of the upper links is convex downward in these radial planes.

32. The improvement claimed in claim 31 characterized further in that the groove in the cross pin has a concave downward curvature in planes radial and parallel to the axis of the cross pin and the lower perimeter of the lower link is convex upward in these radial planes.

33. The improvement claimed in claim 32 characterized further in that the means responsive to the transducer means includes means sensitive to transducer strain on each side of the zone of the vertical loading of the transducer.

* * * * *